US007840500B2

(12) United States Patent
Khanbaghi

(10) Patent No.: US 7,840,500 B2
(45) Date of Patent: Nov. 23, 2010

(54) FUZZY LOGIC CONTROL FOR PROCESS WITH LARGE DEAD TIME

(75) Inventor: Maryam Khanbaghi, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 487 days.

(21) Appl. No.: 11/702,753

(22) Filed: Feb. 6, 2007

(65) Prior Publication Data

US 2008/0133433 A1 Jun. 5, 2008

Related U.S. Application Data

(60) Provisional application No. 60/861,923, filed on Nov. 30, 2006.

(51) Int. Cl.
*G06F 15/18* (2006.01)
(52) U.S. Cl. .............. 706/4; 65/29.17; 65/380; 700/33; 700/50; 700/72
(58) Field of Classification Search .............. 706/4; 65/29.17, 380; 700/157
See application file for complete search history.

(56) References Cited

U.S. PATENT DOCUMENTS

| | | | | |
|---|---|---|---|---|
| 1,389,828 A | * | 9/1921 | Harvey et al. | 198/537 |
| 3,012,373 A | * | 12/1961 | Willis | 222/56 |
| 3,469,962 A | * | 9/1969 | Owen | 65/29.17 |
| 3,482,956 A | * | 12/1969 | Trethewey | 65/29.17 |
| 3,730,695 A | * | 5/1973 | Varrasso | 65/380 |
| 4,011,070 A | * | 3/1977 | Hynd | 65/29.17 |
| 4,615,720 A | * | 10/1986 | Dunn et al. | 65/29.16 |
| 5,159,547 A | * | 10/1992 | Chand | 700/37 |
| 5,205,979 A | * | 4/1993 | Matsuyama et al. | 266/80 |
| 5,272,621 A | | 12/1993 | Aoki | 364/165 |
| 5,726,880 A | * | 3/1998 | Bailey et al. | 700/72 |
| 5,748,467 A | * | 5/1998 | Qin et al. | 700/50 |
| 5,944,863 A | * | 8/1999 | Scott | 65/145 |
| 5,995,532 A | | 11/1999 | Borysowicz-Piliszczuk | 373/104 |
| 6,796,147 B2 | | 9/2004 | Borysowicz et al. | 65/162 |

OTHER PUBLICATIONS

Shoreshi, R.A. Intelligent Control Systems. Modern Control Systems by M.K. Masten, Lesson 10, 1995. p. 375-408.*
S. N. Engin, J. Kuvulmaz and V. E. Ömurlü. Fuzzy control of an ANFIS model representing a nonlinear liquid-level system. Neural Computing & Applications, vol. 13, No. 3, Sep. 1, 2004, pp. 202-210.*
R. Haber et al., "Identification and Adaptive Control of a Glass Furnace", May 1980, pp. 175-185.
G.S. Black, Jr., "Control Technology Applied to Glass Level Regulation", Feb. 1990, pp. 183-188.
S. Aoki et al., "Application of Fuzzy Control Logic for Dead-Time Processes in a Glass Melting Furnace", Apr. 1989, pp. 251-265.

(Continued)

*Primary Examiner*—Donald Sparks
*Assistant Examiner*—David H Kim

(57) ABSTRACT

The present invention relates to a control system, method and computer program product to control a process having a large dead time. An exemplary process controllable by embodiments according to the invention is the glass manufacturing process, where fuzzy logic is used to control a level of molten and melting raw materials in a furnace during a glass-manufacturing process by controlling the rate at which raw materials enter the furnace.

9 Claims, 8 Drawing Sheets

OTHER PUBLICATIONS

H. Zhang et al., "Identification and Control of a Large Kinescope Glass Furnace", Feb. 1989, pp. 887-892.

U. Moon et al., "Multi-Loop Control of Temperature for TV Glass Furnace", Dec. 2000, pp. 4550-4555.

U. Moon et al., "Hybrid Algorithm With Fuzzy System and Conventional PI Control for the Temperature Control of TV Glass Furnace", Oct. 1999, pp. 548-554.

Muller et al., "Expert System ESIII—An Advanced System For Optimal Glass Furnace Control", Glass Services Inc.

Mamdani et al., "Application of Fuzzy Algorithms For Control of Simple Dynamic Plant", Apr. 1974, pp. 1585-1588.

Pina et al., "A Glass Furnace Operation System Using Fuzzy Modelling and Genetic Algorithms for Performance Optimisation", Oct. 2003, pp. 681-690.

* cited by examiner

Exemplary Membership Function for e

Exemplary Membership Function for de

Exemplary Membership Function for dF

|    | NB  | NA  | NS  | ZE  | PS  | PA  | PB  |
|----|-----|-----|-----|-----|-----|-----|-----|
| NB | NBB | NBB | NB  | NA  | NS  | NS  | ZE  |
| NA | NBB | NB  | NA  | NA  | NS  | ZE  | PS  |
| NS | NB  | NA  | NA  | NS  | ZE  | PS  | PS  |
| ZE | NA  | NA  | NS  | ZE  | PS  | PA  | PA  |
| PS | NS  | NS  | ZE  | PS  | PA  | PA  | PB  |
| PA | NS  | ZE  | PS  | PA  | PA  | PB  | PBB |
| PB | ZE  | PS  | PS  | PA  | PB  | PBB | PBB |

Columns: e (level error); Rows: de (change in level error); dF

Exemplary Fuzzy Logic Rules

FIG. 5

FUZZY LOGIC CONTROL FOR PROCESS WITH LARGE DEAD TIME

CROSS-REFERENCE TO RELATED APPLICATIONS

This application claims the benefit of priority under 35 U.S.C. §119(e) of U.S. Provisional Application Ser. No. 60/861,923, filed on Nov. 30, 2006, the content of which is relied upon and incorporated herein by reference in its entirety.

FIELD OF THE INVENTION

The present invention generally pertains to the control of processes having a large variable dead time (time delay) and more particularly to the control of processes having a large variable dead time using fuzzy logic control (FLC) in order to reduce process variability.

BACKGROUND OF THE INVENTION

Glass manufacturing can be described as a process in which raw materials are converted at high temperature to a homogenous melt that is then delivered through a suitable forming process which provides the product before finishing. One exemplary glass melting process comprises a melting furnace (premelt), a fining chamber (finer), and a glass delivery system comprised of at least a stir chamber. The glass melting furnace, or premelt, is the primary component in the overall glass manufacturing process. The premelt level (the level of melted and melting materials in the furnace) is generally manually controlled by changing screw-feed rate. The screw feeder is responsible for the amount of batch (raw materials) going into the premelt furnace. Many glass manufacturing processes are controlled manually because the process is slow enough to allow manual control, and because the process is too complex to be adequately modeled, thus precluding the application of general model-based control system designs. However, in order to provide glass products that comply with tighter customer specifications then it is desired to be able to control glass manufacturing processes to tighter tolerances and less subjective variability.

Therefore, what is needed is a method and system of controlling the premelt process that overcomes many of the challenges found in the art, some of which are described above.

SUMMARY

A method of overcoming some of the described challenges is to employ the use of advanced control technology. An embodiment according to the present invention is to use an advanced control strategy called fuzzy logic control through a fuzzy logic controller (FLC) to control premelt level variation in a process with a large variable dead time (time it takes for the output to react to the input change).

One aspect according to the present invention comprises a system for controlling a process having a large dead-time. The system comprises an actuator controlled by a controller. The actuator is used to adjust a rate at which raw materials enter a premelt furnace in a glass manufacturing process. The system further comprises a level sensor. The level sensor detects a level of molten raw materials in the premelt furnace. Further comprising the system is a fuzzy logic controller operatively connected to the level sensor and the controller. The fuzzy logic controller receives a level signal indicating the level of molten raw materials in the premelt furnace from the level sensor and adjusts the rate based on the level signal in accordance with fuzzy logic rules by sending a control signal to the controller.

In one aspect, the system further comprises a level set-point and a tolerance range such that the rate is adjusted if the level of molten materials in the premelt furnace exceeds the tolerance range from the level set point.

In one aspect of the system, the fuzzy logic controller further comprises a fuzzification interface. The fuzzification interface measures a value for input variables, classifies said input variables, and converts said input variables into linguistic expressions. Further comprising the fuzzy logic controller is a knowledge base that is comprised of a database that contains definitions used to define a set of linguistic control rules and fuzzy data manipulation rules; and a rule base that characterizes control goals and control policy of domain experts by the set of linguistic control rules. The fuzzy logic controller also includes an inference engine. The inference engine is configured to simulate human decision-making based on fuzzy logic and to infer fuzzy control actions based on the set of fuzzy data manipulation rules. Further comprising the fuzzy logic controller of the system is a defuzzification interface that classifies output variables and performs a function of defuzzification to obtain exact values from the set of linguistic control rules.

Yet another aspect according to the present invention is a method of controlling a glass manufacturing process having a large dead-time. The method comprises establishing a level set-point and a tolerance range for a level of molten raw materials within a glass manufacturing process. It is determined whether the level of molten raw materials is within the tolerance range. If the level is not within the tolerance range then a value (e) is determined for the difference between the level and the level set-point, a value (de) is determined for a rate of change of the level of molten materials, the values (e and de) are converted to linguistic expressions with a fuzzification interface, a linguistic control action to take is determined by applying the linguistic expressions to a set of fuzzy logic rules, the linguistic control action is converted to a rate control signal with a defuzzification interface, and the rate control signal is communicated to a controller that controls an actuator. The actuator is used to adjust a rate at which raw materials enter the premelt furnace in the glass manufacturing process.

Another aspect according to the present invention comprises a computer program product comprised of code that is executable by a processor of a computing device for processing tasks for controlling a process having a large dead-time. The computer program product comprises a first executable code portion configured to receive a level set-point and a tolerance range for a level of molten raw materials within a glass manufacturing process and to determine whether the level of molten raw materials within the glass manufacturing process are within the tolerance range. If the level is not within the tolerance range then a second executable code portion is executed that determines a value (e) for a difference between the level and the level set-point and a value (de) for the rate of change of the level and converts the values to linguistic expressions. A third executable code portion is executed that determines a linguistic control action to take by applying the linguistic expressions to a set of fuzzy logic rules and converts the linguistic control action to a rate control signal that is configured to be communicated to a controller that controls an actuator. The actuator is used to adjust a rate at which raw materials enter the premelt furnace in the glass manufacturing process.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention.

DETAILED DESCRIPTION OF THE DRAWINGS

The accompanying drawings, which are incorporated in and constitute a part of this specification, illustrate certain aspects of the instant invention and together with the description, serve to explain, without limitation, the principles of the invention and like reference characters used therein indicate like parts throughout the several drawings:

FIG. 5 illustrates exemplary fuzzy logic rules for an exemplary FLC; and

DETAILED DESCRIPTION

Figure 1A:
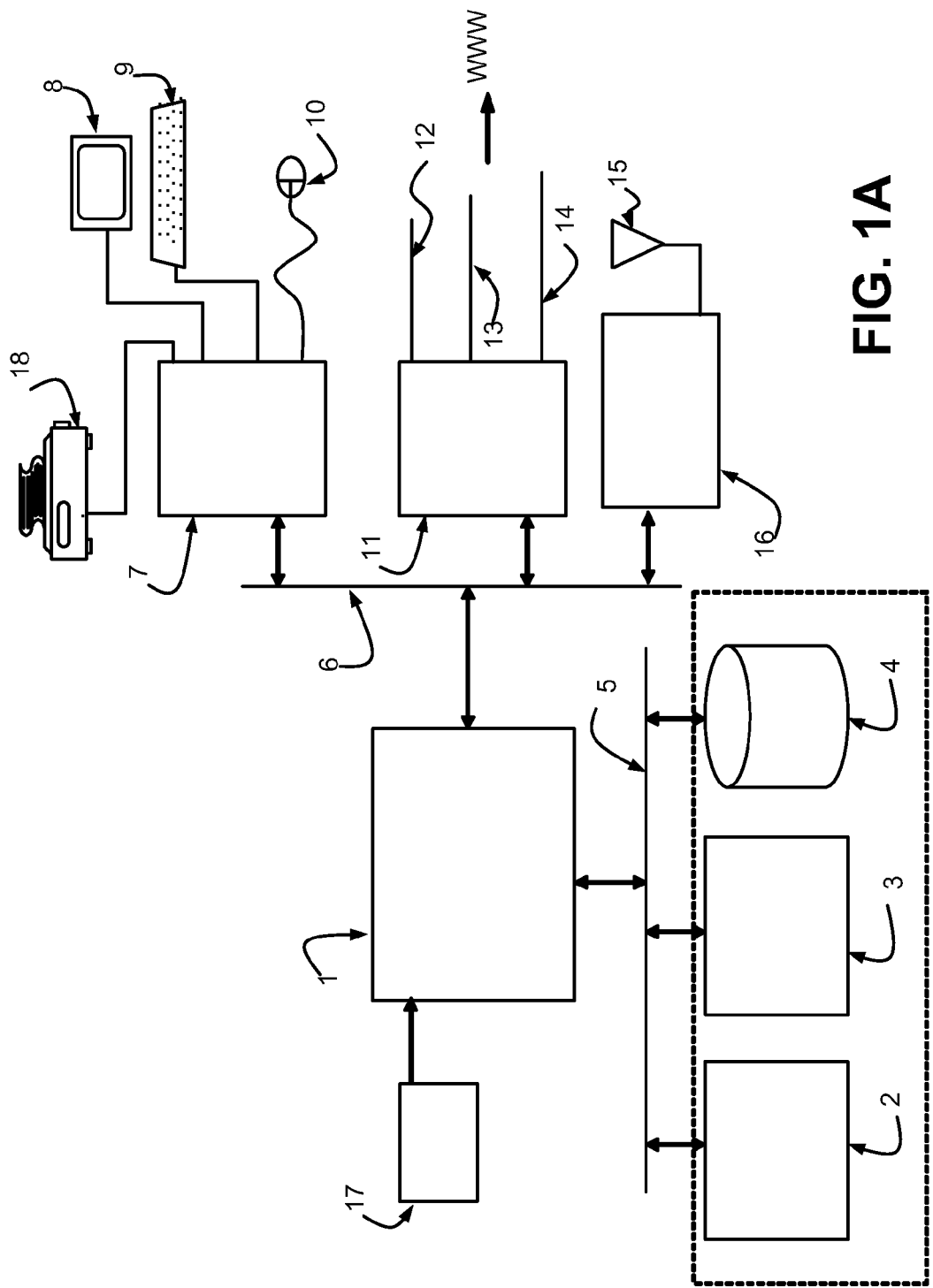
FIG. 1A is an exemplary computing device that can be used to practice aspects of the preferred embodiment.

The present invention may be understood more readily by reference to the following detailed description of the invention and the examples included therein and to the figures and their previous and following description.

Before the present systems, articles, devices, and/or methods are disclosed and described, it is to be understood that this invention is not limited to specific systems, specific devices, or to particular methodology, as such may, of course, vary. It is also to be understood that the terminology used herein is for the purpose of describing particular embodiments only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used in the specification and the appended claims, the singular forms "a," "an" and "the" include plural referents unless the context clearly dictates otherwise. Thus, for example, reference to "a reflector" includes two or more such reflectors, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that throughout the application, data is provided in a number of different formats and that this data represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

"Optional" or "optionally" means that the subsequently described event or circumstance may or may not occur, and that the description includes instances where said event or circumstance occurs and instances where it does not.

As will be appreciated by one skilled in the art, embodiments according to the present invention may be implemented as a method, a data processing system, or a computer program product. Accordingly, an embodiment may take the form of an entirely hardware embodiment, an entirely software embodiment, or an embodiment combining software and hardware aspects. Furthermore, implementations of the preferred embodiment may take the form of a computer program product on a computer-readable storage medium having computer-readable program instructions (e.g., computer software) embodied in the storage medium. More particularly, implementations of the embodiments may take the form of web-implemented computer software. Any suitable computer-readable storage medium may be utilized including hard disks, CD-ROMs, optical storage devices, or magnetic storage devices.

Embodiments according to the present invention are described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In the embodiments referenced herein, a "computer," "computing device," "controller," or "server" may be referenced. Such computer may be, for example, a mainframe, desktop, notebook or laptop, a hand held device such as a data acquisition and storage device, or it may be a processing device embodied within another apparatus such as, for example, a controller as part of a control system. In some instances the computer may be a "dumb" terminal used to access data or processors over a network or a device having limited processing capability such as a controller. Referencing FIG. 1A, one embodiment of a computing device is illustrated that can be used to practice aspects of embodiments according to the present invention. In FIG. 1A, a processor 1, such as a microprocessor, is used to execute software instructions for carrying out the defined steps. The processor 1 receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 1B:
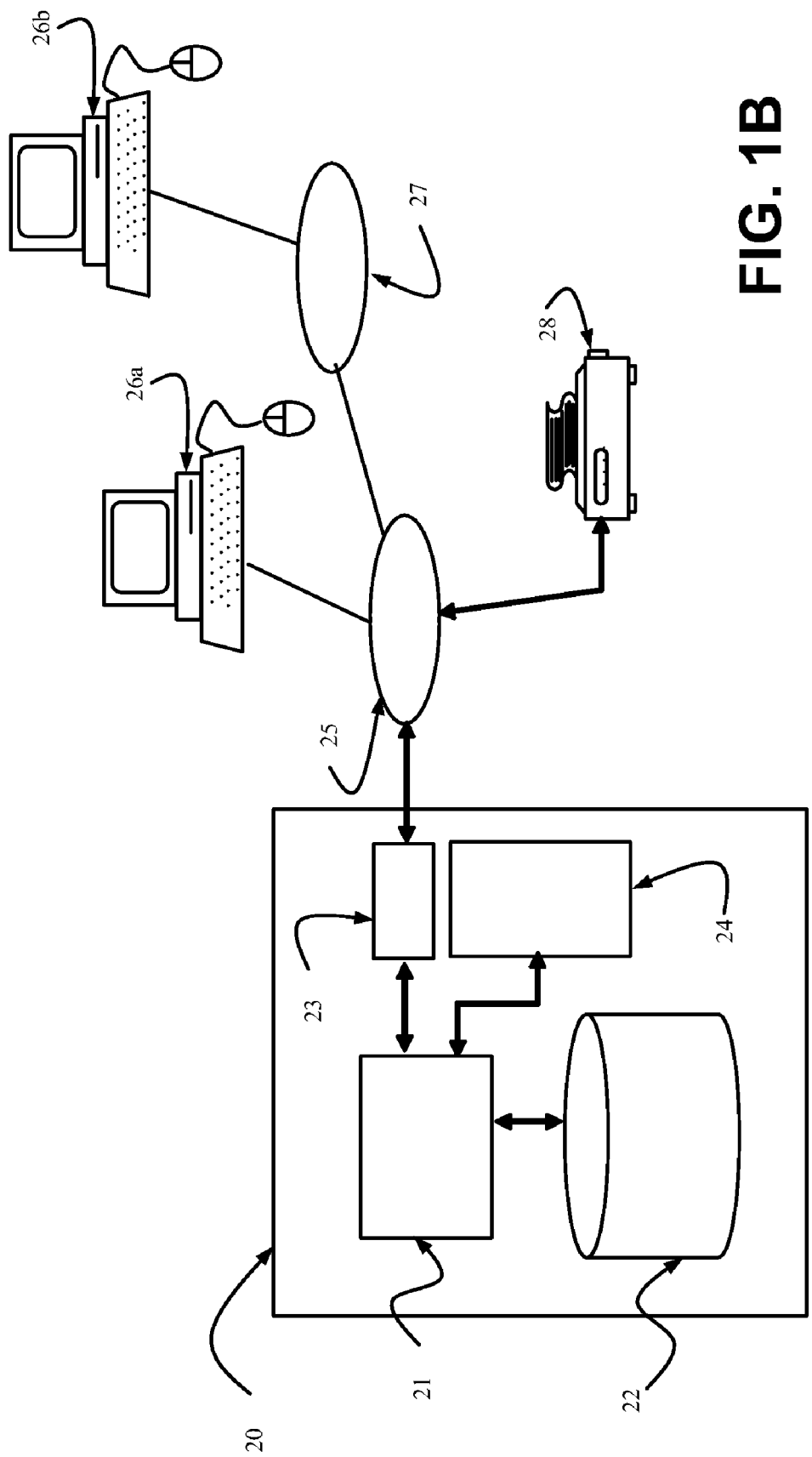
FIG. 1B is an alternative embodiment of a processing system of that shown in FIG. 1A that can be used in embodiments according to the present invention.

An alternative embodiment of a processing system that may be used is shown in FIG. 1B. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the wide area network 27, over the LAN 25, and to the server 20.

Those skilled in the art of data networking will realize that many other alternatives and architectures are possible and can be used to practice embodiments according to the present invention. The embodiments illustrated in FIGS. 1A and 1B can be modified in different ways and be within the scope of the present invention as claimed.

Overview

Figure 2:
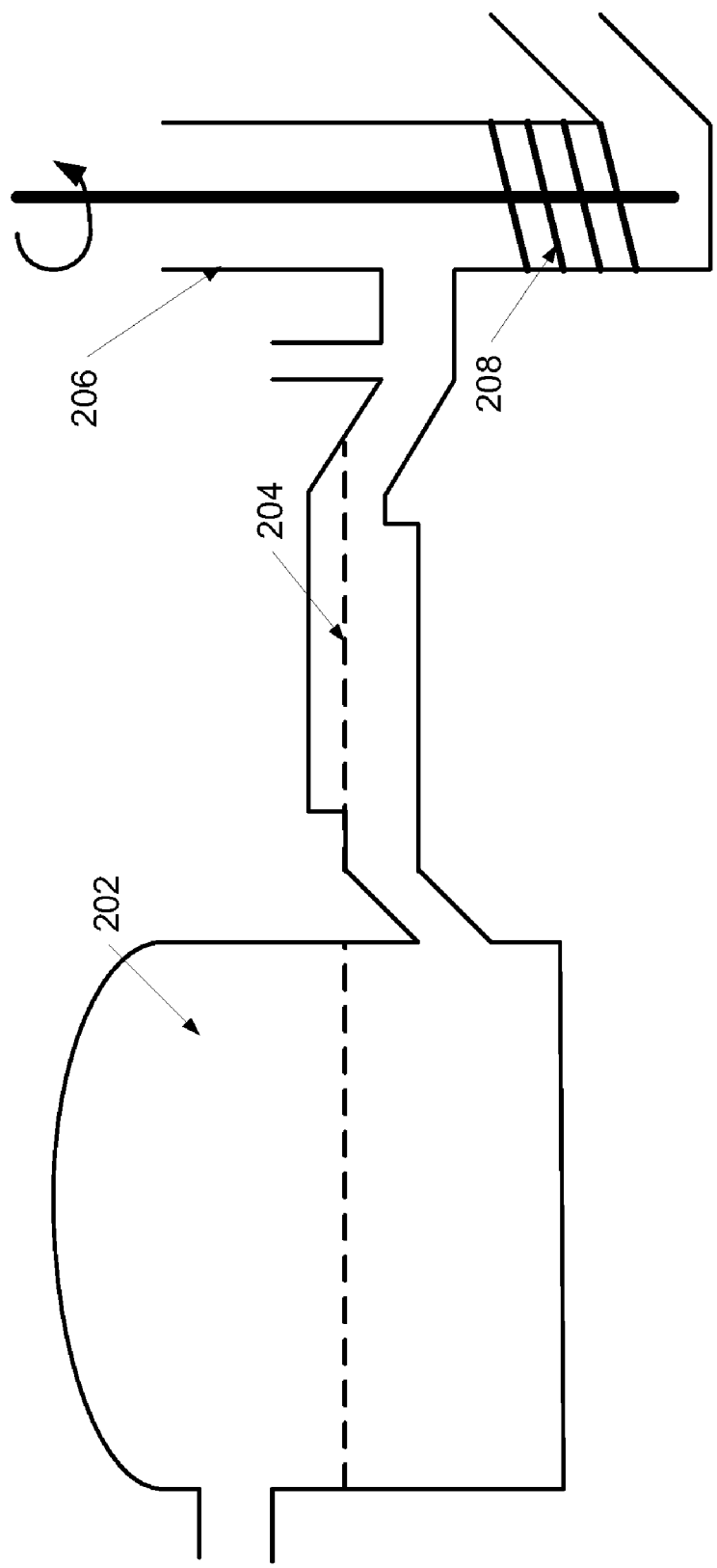
FIG. 2 illustrates an exemplary embodiment of a glass manufacturing process that can be used with aspects the present invention.

Glass manufacturing can be described as the process in which raw materials are converted at high temperature to a homogeneous melt that is then delivered through a suitable forming process which provides the product before finishing. In one embodiment as shown in FIG. 2, a glass manufacturing process comprises a melting furnace, called the premelt 202; a fining chamber, called the finer 204; and a glass delivery system comprised of, for example, a finer-to-stir chamber (FSC) 206, a stir chamber 208, a stir chamber-to-bowl (not shown in FIG. 2), and a bowl and downcomer (also not shown in FIG. 2). In one exemplary embodiment, the forming process occurs via fusion downdraw (or overflow) process, as is known in the art to one of ordinary skill.

Melting occurs in the premelt 202 and is a thermal process by which raw materials (batch) are converted into a molten mixture free of solid or crystalline components. Fining, which occurs in the finer 204, is a process of removing gas bubbles from glass. Because of the design of the process as shown in the embodiment of FIG. 2, molten glass level is generally the same in premelt 202 as it is in the finer 204 and in other parts of the process. Therefore, theoretically, glass level measured in either the premelt 202 or the finer 204 provides the same information. However, under general control theory, the closer a measurement is to an actuating device, the better the control since the measurement responds more quickly to a change in the actuating device. In the instance of FIG. 2, a level sensor is placed after the finer 204 and just before the FSC 206, therefore, there is a delay between the time the actuating device (e.g., a screw feeder) for providing raw materials to the premelt 202 (e.g., the screw feed rate (SFR)) is changed and the time the level of molten glass responds, which is known as dead time. It is to be appreciated, however, that the placement of the level sensor anywhere in the process is contemplated within the scope of the invention.

Figure 3A:
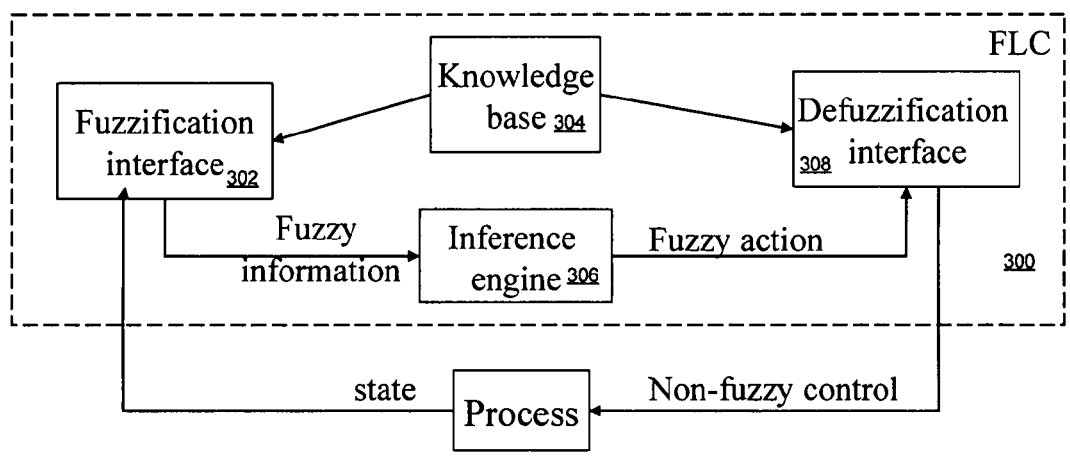
FIG. 3A illustrates a block diagram of the general structure of an exemplary fuzzy logic controller (FLC) that can be used to practice aspects of the present invention.

Aspects according to the present invention provide a control system, method and computer program product to control a process having a large dead time. An exemplary process controllable by embodiments according to the invention is the glass manufacturing process, though other processes having large dead-times are contemplated within the scope according to the present invention. FIG. 3A illustrates a block diagram of the general structure of an exemplary fuzzy logic controller (FLC) that can be used to practice aspects of the present invention. As shown in the embodiment of FIG. 3A, the FLC 300 has four components. One component is a fuzzification interface 302. The fuzzification interface 302 measures the value of input variables, classifies input variables and performs the function of fuzzification that converts input data into suitable linguistic values. Another component of the FLC 300 is a knowledge base 304. The knowledge base 304 is generally comprised of two parts, a data base, which provides definitions and is used to define linguistic control rules and fuzzy data manipulation in the FLC 300; and a rule base, which characterizes the control goals and control policy of the domain experts by means of a set of linguistic control rules. Another component of the FLC 300 is an inference engine 306. The inference engine 306 is configured to simulate human decision making based on fuzzy concepts and on inferring fuzzy control actions employing fuzzy implication and the rules of inference in fuzzy logic. Yet another component of the FLC 300 of FIG. 3A is a defuzzification interface 308. The defuzzification interface 308 classifies output variables and performs the function of defuzzification to obtain exact values from a fuzzy control. There are different methods of defuzzification employed by the defuzzification interface 308 such as, for example, max-height method, mean of maximum method and center of gravity method.

In an embodiment according to the present invention, the FLC 300 generates an increment for an actuating device that supplies materials to a process. For example, the FLC 300 can supply an increment signal for screw feed rate (SFR) to a screw feeder. Rules for fuzzy logic control can be derived from observation of human decision-making during manual control of a process. For example, process engineers and line operators can be observed and data gathered and analyzed during manual control to understand when a change is required in a process.

Figure 3B:
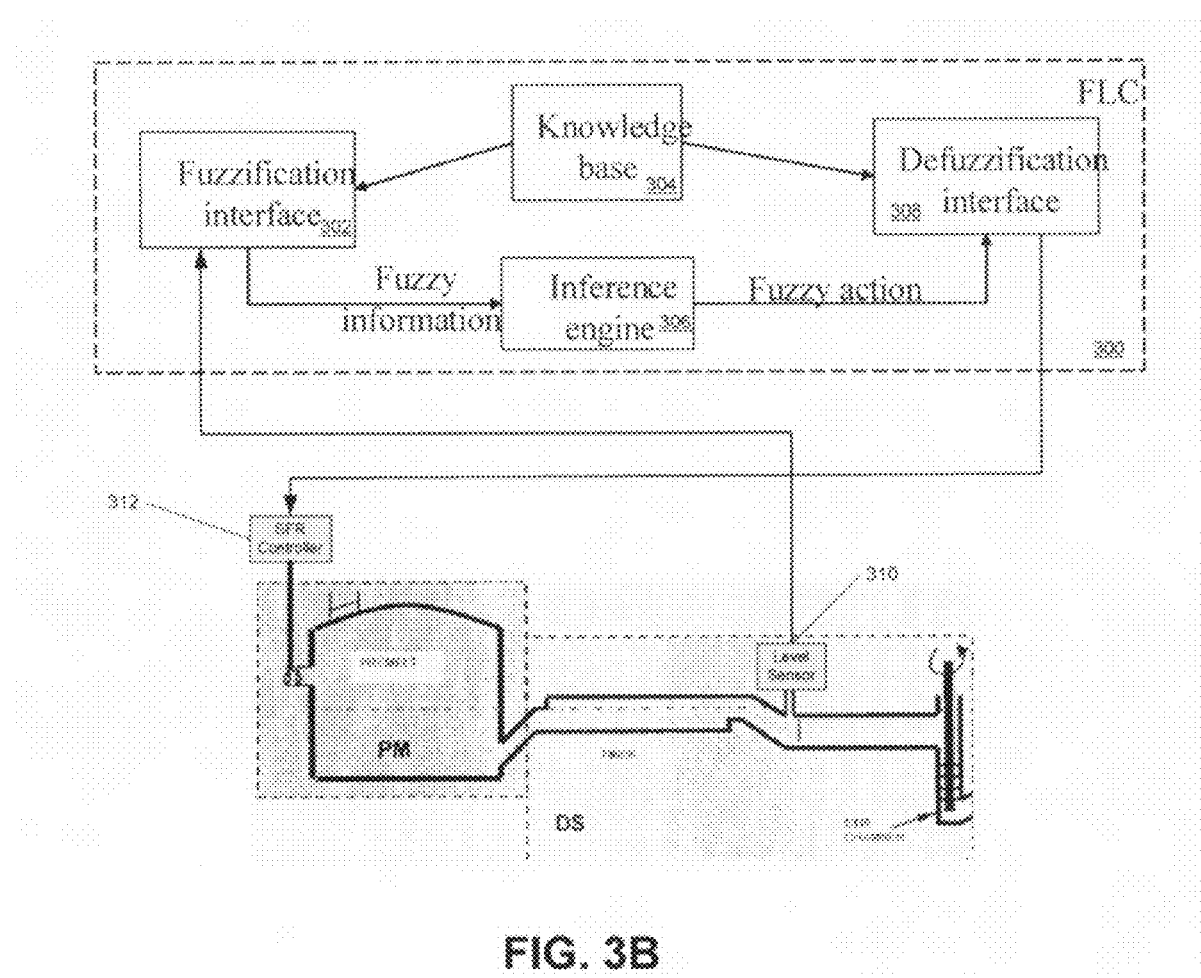
FIG. 3B is an illustration of a FLC configured to control the tank level of molten and melting materials in a glass manufacturing process.

FIG. 3B is an illustration of a FLC 300 configured to control the tank level of molten and melting materials in a glass manufacturing process. As shown in FIG. 3B, inputs to the FLC's fuzzification interface 302 are received as one or more signals from a level sensor 310 that is configured to measure the level of molten and melting raw materials in the glass-making process and convert the measured level to a signal. The level sensor is also configured to have an established setpoint and to determine a value for the difference between the measured value and the setpoint value. The inputs to the fuzzification interface 302 of the FLC 300 include level error (e), which is the level set-point minus the measured level, and change in level error (de). An output from the FLC 300 can be the percentage change of SFR (dF). In this instance, membership functions for e, de, and dF are assumed as triangular shapes and the fuzzy partitions and creation of the rule base were drawn from observed manual rules. The e, and de are divided into linguistic expressions. These linguistic expressions can be, for example, positive big (PB), positive medium (PM), positive small (PS), zero (ZE), negative big (NB), negative medium (NM) and negative small (NS). The number of linguistic terms used for input variables determines the number of fuzzy control rules. Here, for example, there are two input variables (e and de) and seven linguistic terms, which results in $7^2=49$ rules. dF can also be divided into linguistic expressions such as, for example, positive big (PB), positive medium (PM), positive small (PS), zero (ZE), negative big (NB), negative medium (NM) and negative small (NS), negative big big (NBB), and positive big big (PBB).

The input variables e and de are converted to linguistic expressions by the fuzzification interface 302 and, by the inference engine 306 cooperatively working with the knowledge base 304, a fuzzy logic rule is determined for the linguistic expressions based upon their membership functions.

Figure 4A:
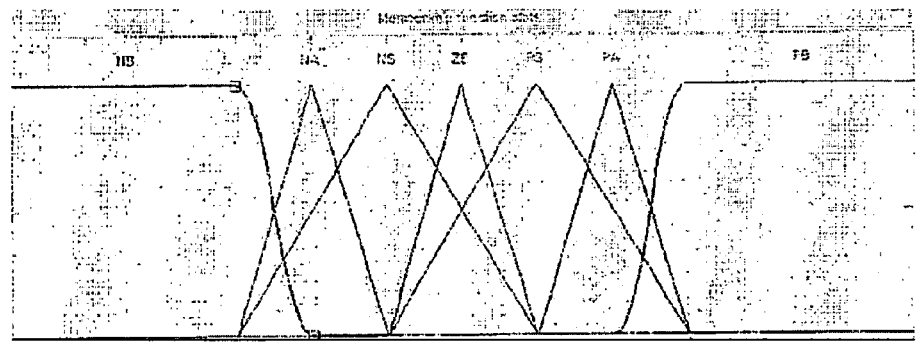
FIGS. 4A-4C illustrate exemplary membership functions for e, de, and dF having certain linguistic expressions.
Figure 4B:
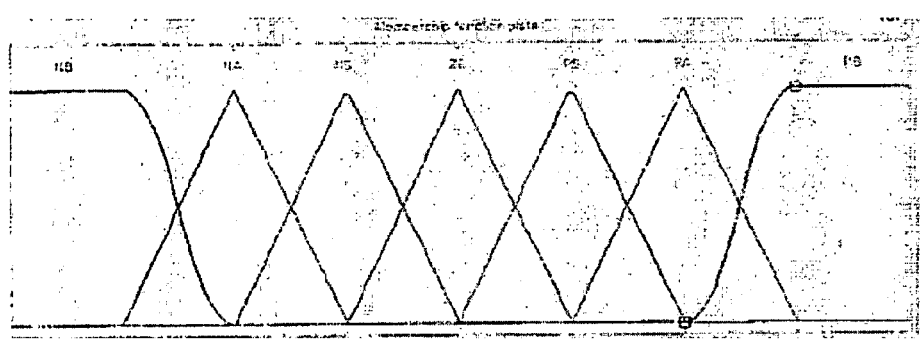
Figure 4C:
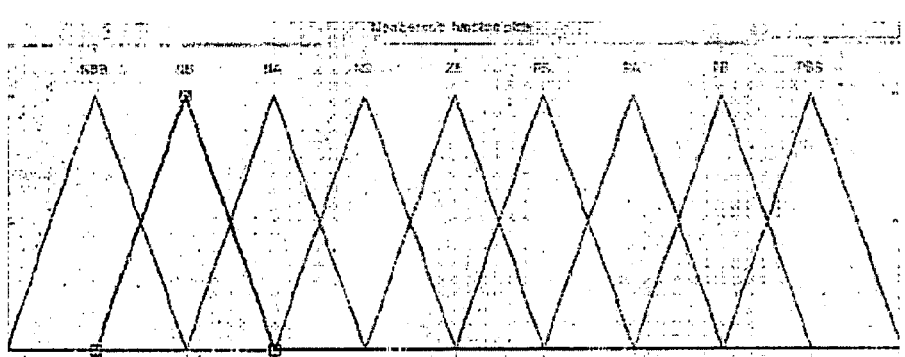

FIGS. 4A-4C illustrate exemplary membership functions for e, de, and dF having the linguistic expressions described above. The rule base is the linguistic expression of output dF as a function of e and de and is obtained from operator experience of the process and the results of manual rules. The more knowledgeable the control engineer is about the process, the better the performance of the controller. An exemplary rule can be: If e is ZE and de is ZE, then ΔF is ZE. Additional exemplary fuzzy logic rules are shown in FIG. 5 for an exemplary FLC.

The exemplary FLC described by the rules of FIG. 5 has 49 rules. The inference based on these rules is carried out by fuzzy inference, a kind of approximate reasoning technique. For example, e(k) and de(k) are the inputs to the FLC at the $k^{th}$ step. The crisp inputs are fuzzified by the fuzzification interface and the product inference based on the knowledge base and the inference engine is used. For example, if the fuzzy sets of e, de and dF of the $i^{th}$ rule are expressed as $A_i$, $B_i$, and $C_i$ respectively, and the variables e, de and dF are expressed as x, y and z respectively; then the truth value of the $i^{th}$ rule at the $k^{th}$ sampling step is given by:

$$\omega_i = \mu_{A_i}(x) \hat{}\, \mu_{B_i}(y)$$

where ˆ is the minimum operator. Using the product operation rule of fuzzy implication, then the output fuzzy set C is calculated as:

$$\mu_C(z) = \bigcup_{i=1}^{m} \omega_i \mu_{C_i}(z)$$

where m is the number of class of rules. Once a fuzzy logic rule (dF) is selected for a given e and de, the linguistic rule is "defuzzified" into a signal configured to control a device such as a screw feeder. As shown in FIG. 5, exemplary linguistic rules include NBB, NB, NA, NS, ZE, etc. These fuzzy rules can be converted into crisp values. For example, the defuzzification strategy chosen can be the center of gravity given by:

$$dF = \frac{\sum_{i=1}^{m} z \mu_{C_i}(z)}{\sum_{i=1}^{m} \mu_{C_i}(z)}$$

where dF is the crisp result of fuzzy inference. At each sampling instance k, the set-point for the flow bridge is updated. It is to be appreciated, however, that other methods of defuzzification such as the max-height method and the mean of maximum method are contemplated within the scope of this invention. Defuzzification occurs through the defuzzification interface 308.

Referring back to FIG. 3B, the crisp value from the defuzzification interface is used as a control signal to control, for example, an actuator such as a screw-feed rate controller 312. The screw-feed rate controller 312 controls that rate of raw materials entering the premelt furnace.

Figure 6:
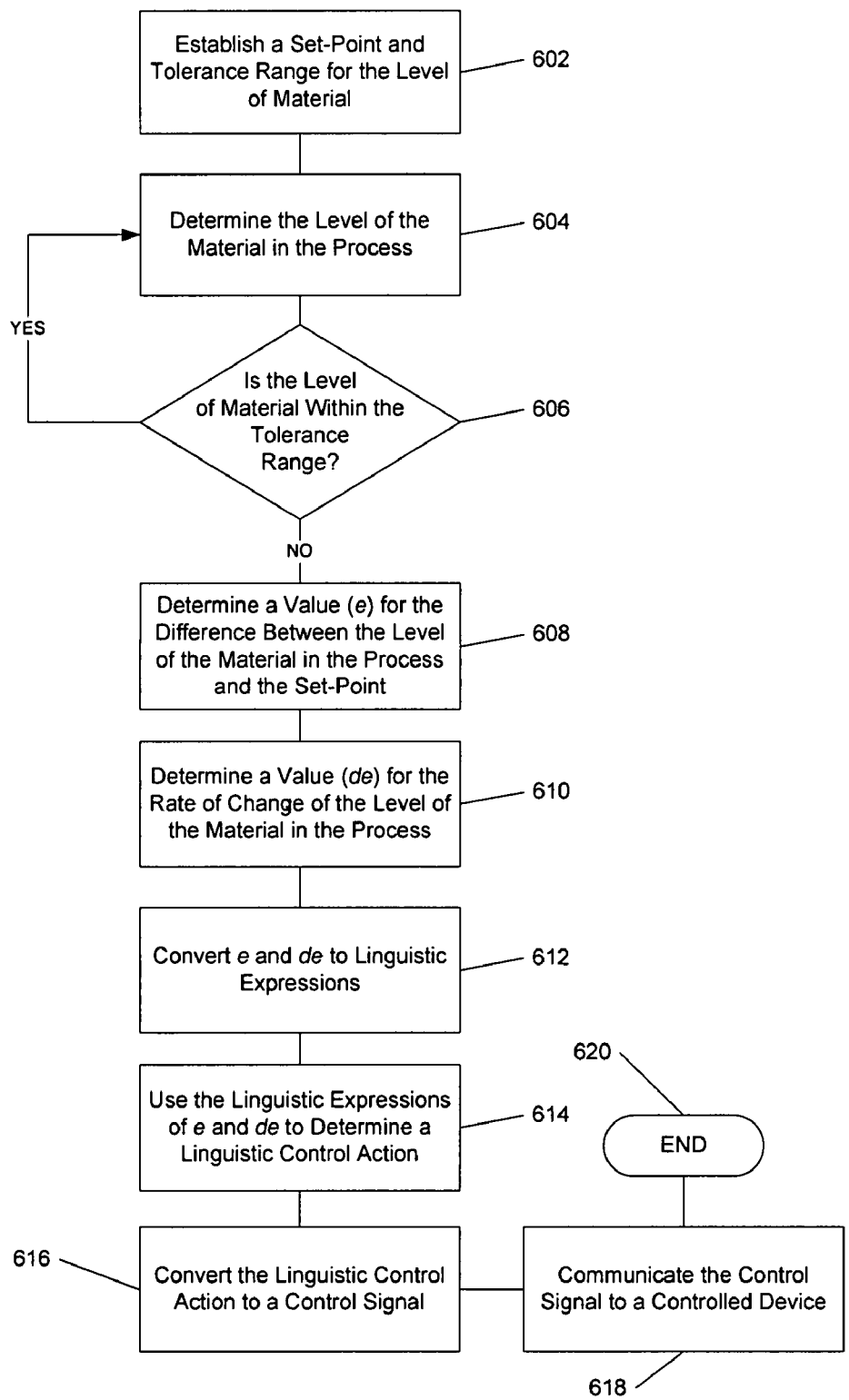
FIG. 6 is a flowchart describing an exemplary method of controlling a glass manufacturing process having a large dead-time in an embodiment according to the present invention.

FIG. 6 is a flowchart describing an exemplary method of controlling a glass manufacturing process having a large dead-time in an embodiment according to the present invention. Step 602 of the process comprises establishing a level set-point and a tolerance range for a level of molten raw materials within a glass manufacturing process. The level-set point and tolerance range can be established by observation of manually-controlled processes and may be adjusted in order to decrease variability in the process. In one exemplary embodiment, establishing a level set-point and a tolerance range for a level of molten raw materials within a glass manufacturing process comprises a tolerance range less than ±1.0 inch from the level set point. At step 604, the level of molten raw materials in a glass manufacturing process is determined. This can be preformed by, for example, a level sensor. Step 606 comprises determining whether the level of molten raw materials in the glass-manufacturing process is within the tolerance range. If, at step 606, the level is not within the tolerance range then at step 608 a value (e) is determined for the difference between the level and the level set-point. At step 610, a value (de) is determined for the rate of change of the level of the material in the glass-manufacturing process.

At step 612, the values (e and de) are converted to linguistic expressions. This linguistic expression conversion can be performed by a fuzzification interface of a fuzzy logic controller. At step 614, a linguistic control action is determined by applying the linguistic expressions to a set of fuzzy logic rules. At step 616 the linguistic control action is converted to a control signal. This conversion can be performed with a defuzzification interface of a fuzzy logic controller. At step 618, the control signal is communicated to a control device. For example, a rate control signal can be communicated to a controller that controls an actuator, wherein said actuator is used to adjust a rate at which raw materials enter the premelt furnace in the glass manufacturing process. In one exemplary embodiment, communicating said rate control signal to a controller that controls an actuator comprises communicating said rate control signal to a controller that controls a screw-feeder. Returning to step 606, if the level of molten raw materials in the glass-manufacturing process is within the tolerance range, the process returns to step 604. The process ends at step 620. It is to be appreciated that the level of molten raw materials in the premelt furnace can react non-linearly with a change in the rate at which raw materials enter the premelt furnace in the glass manufacturing process and such reaction is contemplated within the scope of this invention.

It is to be appreciated that the above-described process can be captured as an algorithm programmed into one or more executable code portions that are operable on a processor such as the one described in FIGS. 1A and 1B, and can be stored or transmitted on one or more forms of computer-readable media such as, for example, CD-ROM, solid state memory devices, and signals.

Although several aspects of the present invention have been disclosed in the foregoing specification, it is understood by those skilled in the art that many modifications and other aspects of the invention will come to mind to which the invention pertains, having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims which follow, they are used only in a generic and descriptive sense, and not for the purposes of limiting the described invention.

What is claimed is:

1. An apparatus for a glass manufacturing process having a large dead-time comprising:
    an actuator configured to be controlled by a raw material controller, wherein said actuator is configured to adjust a rate at which raw materials enter a premelt furnace to be transformed to a molten state;
    a level sensor configured to detect a level of molten raw materials in the premelt furnace; and
    a fuzzy logic controller operatively connected to the level sensor and the raw material controller,
    wherein said fuzzy logic controller is configured to receive a level signal indicating the level of molten raw materials in the premelt furnace from the level sensor and to adjust the rate based on the level signal in accordance with fuzzy logic rules by sending a control signal to the raw material controller only if the level of molten raw material is not within a tolerance range from a level set-point.

2. The apparatus of claim 1, wherein said fuzzy logic controller further comprises:
    a fuzzification interface, wherein said fuzzification interface is configured to measure a value for input variables, classify said input variables, and convert said input variables into linguistic expressions;
    a knowledge base that is comprised of,
        a database, wherein said database contains definitions used to define a set of linguistic control rules and fuzzy data manipulation rules, and
        a rule base, wherein said rule base is configured to characterize control goals and control policy of domain experts by the set of linguistic control rules;
    an inference engine, wherein said inference engine is configured to simulate human decision-making based on fuzzy logic and to infer fuzzy control actions based on the set of fuzzy data manipulation rules; and
    a defuzzification interface, wherein said defuzzification interface is configured to classify output variables and perform a function of defuzzification to obtain exact values from the set of linguistic control rules.

3. The apparatus of claim 1, wherein the actuator is a screw-feeder.

4. A method of using an apparatus for controlling a glass manufacturing process having a large dead-time, comprising the steps of:
    providing the apparatus with an actuator, a fuzzy logic controller, a raw material controller, and a premelt furnace;

establishing a level set-point and a tolerance range for a level of molten raw materials within the glass manufacturing process; and determining whether the level of molten raw materials is within the tolerance range, wherein if said level is within the tolerance range then, continuing to determine whether the level of molten raw materials is within the tolerance range, and wherein only if said level is not within the tolerance range then using the fuzzy logic controller to, determine a value (e) for the difference between the level and the level set-point, determine a value (de) for a rate of change of the level of molten materials, convert the values (e and de) to linguistic expressions with a fuzzification interface, determine a linguistic control action to take by applying the linguistic expressions to a set of fuzzy logic rules, convert the linguistic control action to a rate control signal with a defuzzification interface, and communicate said rate control signal to the raw material controller, and wherein, based on the rate control signal, said raw material controller causes said actuator to adjust a rate at which raw materials enter the premelt furnace to be transformed to a molten state.

5. The method of claim 4, wherein establishing a level set-point and a tolerance range for a level of molten raw materials within a glass manufacturing process comprises a tolerance range of less than ±1.0 inch from the level set point.

6. The method of claim 4, wherein determining a linguistic control action to take by applying the linguistic expressions to a set of fuzzy logic rules comprises applying the linguistic expression to a knowledge base that is further comprised of a database, wherein said database contains definitions used to define a set of linguistic control rules and fuzzy data manipulation rules; a rule base, wherein said rule base characterizes control goals and control policy of domain experts by the set of linguistic control rules; and an inference engine, wherein said inference engine is configured to simulate human decision-making based on fuzzy logic and to infer fuzzy control actions based on the set of fuzzy data manipulation rules.

7. The method of claim 6, wherein converting the linguistic control action to a rate control signal with a defuzzification interface comprises classifying any output variables and performing a function of defuzzification to obtain exact values from the set of linguistic control rules.

8. The method of claim 4, wherein communicating said rate control signal to the raw material controller that controls the actuator comprises communicating said rate control signal to the raw material controller that controls a screw-feeder.

9. The system of claim 4, wherein the level of molten raw materials in the premelt furnace reacts non-linearly with a change in the rate at which raw materials enter the premelt furnace in the glass manufacturing process.

* * * * *